T. WHITING.
Measuring-Wheels for Wagon-Tires.
No. 138,829.                        Patented May 13, 1873.
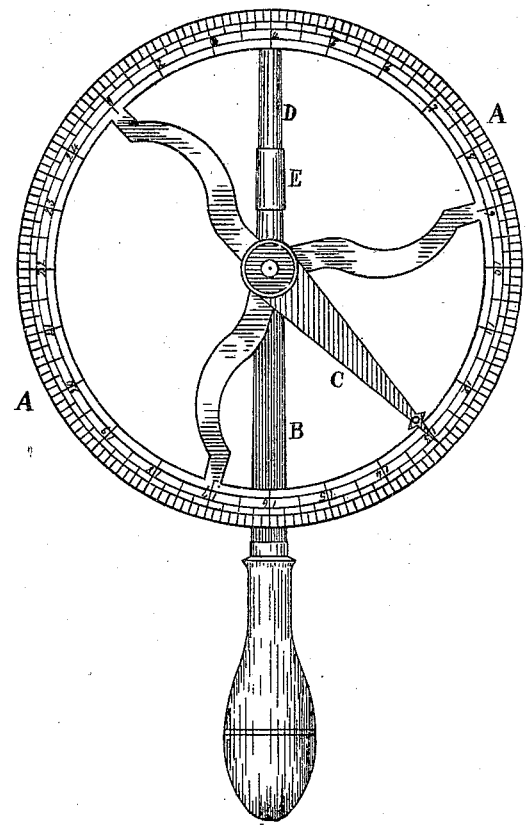
Witnesses —
Geo. A. Howe
John S. Howard.
Inventor —
Truman Whiting

UNITED STATES PATENT OFFICE.

TRUMAN WHITING, OF NILES, MICHIGAN.

IMPROVEMENT IN MEASURING-WHEELS FOR WAGON-TIRES.

Specification forming part of Letters Patent No. 138,829, dated May 13, 1873; application filed October 21, 1871.

*To all whom it may concern:*

Be it known that I, TRUMAN WHITING, of Niles, in the county of Berrien and State of Michigan, have invented certain Improvements in Measuring-Wheels for Measuring Wagon-Tires, &c., of which the following is a specification:

My invention consists in constructing a measuring-wheel having an exact number of inches in its circumference, and marked with a scale of inches and fractional parts of an inch on one or both sides, and in providing the wheel with a movable hand or index, and the handle of the device with a spring-actuated pencil; the object being to facilitate the work of measuring circles.

In the accompanying drawing making a part of this specification, A represents a wheel. This wheel is pivoted to the handle B in the usual manner of making such devices. The size of said wheel is such that some exact number of inches will just fill the circumference. A scale of inches and equal fractional parts of an inch are marked on one or both sides of said wheel. D represents a sheath attached to the outer end of the handle B. This sheath contains a pencil and coiled spring, so arranged that the pencil will be held back in the sheath when not in use. E represents a sleeve. This sleeve fits loosely over the sheath D, and is attached to the pencil through a slot in the sheath. C represents a movable index. This index turns on the axis of the wheel A, and may be made to point to any figure on the scale.

Now, to operate this device, a mark must first be made on the circle to be measured for a starting-point. To do this the pencil in the sheath D is projected by sliding the sleeve outward. When the mark is made the pencil will be returned to its sheath by the action of said spring. Thus the mark can be neatly and expeditiously made. Then the point on the wheel where the scale commences is placed against this mark and the wheel is run around the circle, the number of revolutions of the wheel being noted. On arriving at the starting-point the index C is set to that point. Thus the distance around the circle will be readily indicated, and the mind of the operator relieved from the necessity of recollecting, as the scale may be referred to at any time thereafter.

Having described my invention in the most exact terms that I can give, what I claim is—

In a device for measuring tires, the combination of the wheel A, having the scale of inches and fractional parts of an inch on one or both sides, with the handle B, having the sheath D containing a pencil and spring, as described, the sleeve E, and the movable index C, all as and for the purposes hereinbefore set forth.

TRUMAN WHITING.

Witnesses:
GEO. A. HOWE,
THOMAS SIEWERTSEN.